[ELECTRIC POWER SUPPLY APPARATUS FOR ELECTRIC]
METHOD OF ELECTRICAL DISCHARGE MACHINING

Original Filed Aug. 29, 1960 2 Sheets-Sheet 1

INVENTOR.
KIYOSHI INOUE

BY

Reynolds & Christensen

ATTORNEYS

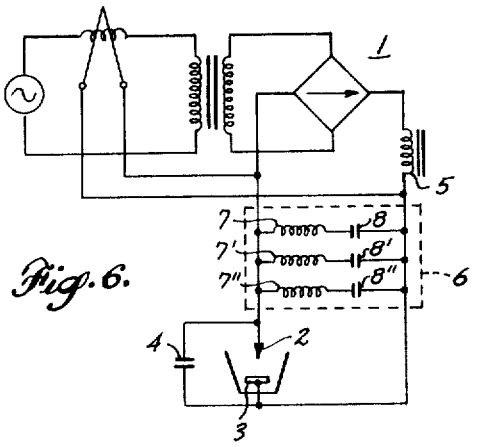
Fig. 6.
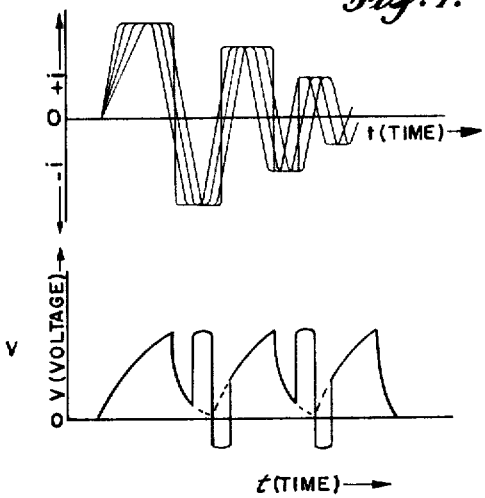
Fig. 7.
Fig. 8.
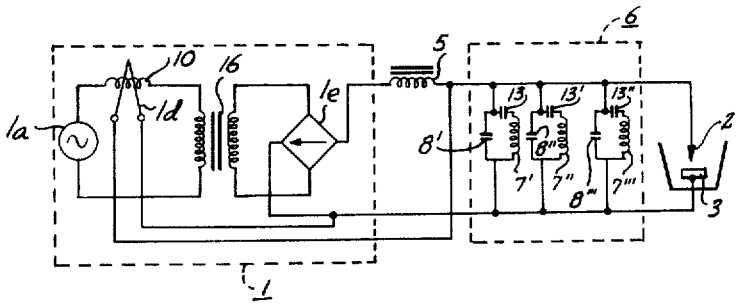
Fig. 9.
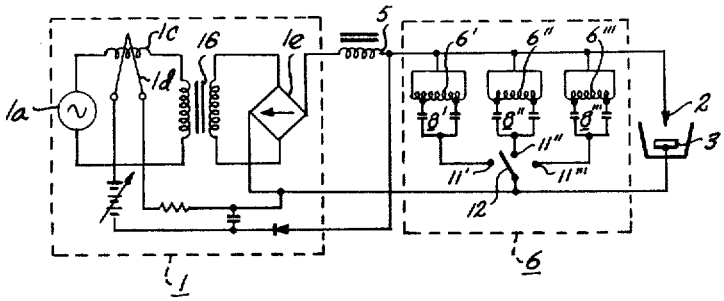
Fig. 10.
INVENTOR.
KIYOSHI INOUE
BY
Reynolds, & Christensen
ATTORNEYS United States Patent Office Re. 26,090
Reissued Sept. 20, 1966

26,090

[ELECTRIC POWER SUPPLY APPARATUS FOR ELECTRIC] *METHOD OF ELECTRICAL* DISCHARGE MACHINING

Kiyoshi Inoue, 182 3-chome Setagaya-ku, Tamagawayoga-machi, Tokyo-to, Japan

Original No. 3,087,044, dated Apr. 23, 1963, Ser. No. 52,395, Aug. 29, 1960. Application for reissue Apr. 23, 1965, Ser. No. 450,579
12 Claims. (Cl. 219—69)

Matter enclosed in heavy brackets [ ] appears in the original patent but forms no part of this reissue specification; matter printed in italics indicates the additions made by reissue.

This invention relates to electric power supply apparatus for spark-discharge machining, and more particularly it relates to a new and improved power supply apparatus for electric discharge machining wherein secondary, follow-up discharging is effected after primary, main discharging, and both the machining speed and the smoothness of the surface of the work piece are improved.

The mechanism of the process of spark discharge machining is understood to be as follows: As the distance between the electrode and work piece is reduced, the flow of electrons which travel from the electrode toward the work piece excites the liquid interposed between the electrode and work piece, cumulatively produces a stream of electrons, and transforms it into spark discharge. Then, when the discharge path is in a completely disintegrated state, the discharge points of the electrode and the work piece evaporate because of the discharge heat and separate into gaseous phase and molten liquid phase. Meanwhile, however, an electromagnetic force (pinch effect) and a high-pressure mechanical force are created in the discharge region by the action of the discharge current. Said forces act to form a crater in the liquid phase portions and simultaneously expel the cut chips out of the discharge region. When the discharging thus ends, the said crater thereafter assumes a dish shape, and in accompaniment, a creater mound is formed as a ring about the periphery of said crater.

Since the electrode and work piece, once their crater mound and crater have been formed, are separated by an infinitesimal gap, local short-circuit points are ordinarily created at the crater mound portion. If, as a supposition, the discharging is not completed by the time the said short-circuit points are created, the residual energy will pass through the short-circuit points in a concentrated manner and will instantaneously melt and vaporize the said points.

When this phenomenon is viewed from the point of view of metal working, it may be correctly inferred that the process comprising the initial forming of the crater mound and crater followed by the melting of the short-circuit points means that the process comprising the rough working process of forming the crater mound and crater and the finishing process of melting away the short-circuit points can be doubly achieved within a single discharge, thus multiplying the machining speed, and simplifying the process.

For the above reason, if an electric power source having a wide pulse width is used so that the discharge current will flow, unchanged, during also the short-circuiting of the crater mound, the aforesaid two kinds of processes can be made possible with a single discharge. On the other hand, however, excessive discharging energy, in general, entails to a considerable degree the possibility of converting of the spark discharging into arc discharging. In spark discharge processing, transformation into arc discharging means impossibility of further processing. Therefore, in order to maintain only spark discharging, it is necessary to select the pulse with sufficiently short width. For this reason the melting away of the short-circuit points with excessive energy is, in general, undesirable.

The use of a pluse of narrow width, as mentioned above, is sometimes accompanied by the following disadvantageous result. That is, the discharge energy is expended for only the formation of the crater mound and crater. The crater mound and crater which have, for this reason, been retained in the short-circuited condition without being melted away, are caused by the pulse of overwhelmingly excessive energy content and subsequent melting away of the short-circuit points. This causes a further increase in their crater mound portions and supplementary lengthening of said short-circuit points. In such a case, both the electrode and work piece become completely short-circuited and prevent further machining just as in the case of arc discharging.

In discharge processing, in general, it is necessary to secure and follow up so as to maintain the gap between the electrode and work piece constant at all times, regardless of the progress of the machining. If, as described above, short-circuiting occurs constantly, the prevention of short-circuiting of the electrode and work piece will become the priority problem, and the maintenance of constant gap will become insignificant. As counter measures, two methods are conceivable: the method of temporarily stopping the supply of electric energy at the time of short-circuiting, forcibly separating the electrode and work piece, and suppressing the development of discharge; and the method of providing the electrode servo-mechanism with precision, causing it to follow up precisely and positively, and thereby preventing short-circuiting.

In application of the former of the two methods mentioned above, operation may occur only when short-circuiting has occurred over a substantially long period of time (several cycles). Therefore, it cannot be expected to operate with high sensitivity responding to short-circuiting during only one cycle. Moreover, such a system requires comparatively complex apparatus.

Also, in the application of the aforesaid second method, even if the electrode servo-mechanism is provided with an extremely high degree of precision, if the expected frequency of the pulse repetitions is, say, from 500 to 1,000 kilocycles per second, it will be necessary to effect the follow up of the electrode, also, within the range of $10^{-5}$ to $10^{-6}$ seconds, and it must be said that, because of inertia, the use of such electrode servo-mechanisms is practically impossible.

Moreover, a special relation exists between the length of spark gap and the machining speed, and when the spark gap is of an appropriate length, a maximum machining speed is obtained, but when the spark gap is greater or smaller than said appropriate length, the machining speed is reduced. If short-circuiting is feared, and the electrode servo-mechanism is designed so that the length of spark gap will be greater than the appropriate value, the frequency of discharge repetition will decrease, and this also contributes to the lowering of the machining speed. Or, if an effort is made to maintain length of the spark gap at an appropriate value, the possibility of short-circuiting will constantly be present. In this case also, an ideal follow-up mechanism for blocking this possibility cannot be hoped for because of the influence, as mentioned above, of mechanical inertia and electrical time constant.

The above method has the disadvantage in that, even if the electrode servo-mechanism is provided with a high degree of precision in order to suppress the short-circuiting as described above, the only result is to increase the cost of construction, and the desired result cannot be attained.

In view of the foregoing points, it is an object of the present invention to provide a power supply system for electric discharge machining wherein, after a primary, main discharging, a secondary, follow-up discharging is caused to take place, and the short-circuiting points are melted away without any conversion into arc discharging.

It is another object of this invention to provide an electric discharge circuit which provides, in a short time interval, a secondary, follow-up discharge of high energy.

It is yet another object of this invention to provide a power supply system for electric discharge machining wherein the time at which the secondary follow-up discharge commences is controlled in accordance with the metal material to be used.

It is a further object of this invention to provide a power supply system for spark discharge machining wherein the time of flowing of the secondary, follow-up discharge current may be controlled in accordance with the kind of metal material to be used.

Such objects and other objects of this invention have been achieved, in one embodiment of this invention, by the apparatus wherein an inductance-capacity circuit which resonates at a relatively high frequency is connected in parallel to a condenser for spark discharge machining (for generating the main discharge pulses) connected across the electrode and the work piece, so as to produce automatically, but only when required, a secondary, follow-up discharge of a frequency which is high relative to the fundamental of the main discharge pulse envelope. This secondary, high-frequency discharge circuit forms a closed circuit through the spark gap only when short-circuiting is caused to occur by the primary, main discharge, and supplies just enough energy to cause the melting away of the short-circuit points by joule heat of the high-frequency current. Consequently, the high-frequency current does not participate directly in normal machining due to the spark discharge. During a normal machining impulse the impedance change across the gap is insufficient to induce high-frequency discharging, and the energy is caused to remain in its stored state until the subsequent occurrence of short-circuiting. In view of the necessity of utilizing all means to supress the conversion into arc discharging, the apparatus is preferably designed so that when a short-circuit condition induces supplemental discharge from the high-frequency circuit the high-frequency discharge is dissipated and terminated, if possible, within one half cycle of the frequency of repetition of the principal spark discharge impulses.

The reasons for the selection of high-frequency current especially for the secondary, follow-up discharge are as follows:

The first reason is that, if the current is a high-frequency current, this current can be obtained merely by connecting an extremely simple, inductance-capacity circuit in parallel to the condenser for pulse generation without the necessity of providing a special power source for high frequency current.

The second reason is that with this circuit almost no resistance exists in the circuit, and all of the energy stored in the condenser can be used for melting away the short-circuit points.

The third reason is that it is possible to establish the condition that through the resistance (resistance determined by the degree of movement of the ions) of the discharge path which is created temporarily at the time of spark discharging, the current is temporarily restrained by the inductances so that the energy in the condenser will not discharge directly, and once the short-circuit points have been created, it is possible for the first time to build up the current from zero.

The said final reason is that the use of high-frequency current is an indispensable condition for the blocking of the conversion from spark discharging into arc discharging.

In another embodiment of this invention, a C-type resonant circuit is inductively coupled further to the inductance of the secondary, high-frequency discharge circuit; and the apparatus is so arranged that the effective inductance of the circuit as a whole is reduced, and the effective capacitance is increased. Thus, in the discharge energy expressed by $1/2\ CV^2$, increase of the term C is attained, and the variation of the term $V^2$ is compensated for.

In still another embodiment of this invention, the circuit for the secondary, follow-up discharge is composed of a plurality of parallel-connected, resonant circuits, each having a slightly different resonant frequency, Then, at the time of short-circuit, the various resonant circuits connected in parallel are simultaneously closed, and the resultant discharge current assumes the form of a geometric envelope of the combined forms of the discharge currents of the various resonant circuits.

In a further embodiment of this invention, the secondary, high-frequency, discharge circuit is composed of a plurality of discharge circuits of different time constants so that in accordance with the kind of metal material of the electrode and work piece any discharge circuit having a special time constant may be selected.

Heretofore, a method wherein a high-frequency voltage is impressed across the electrode and work piece, and a direct-current voltage is further superimposed thereon to accomplish a spark discharge machining has been proposed. By this method, since a direct-current bias is imposed on the high-frequency voltage, and only a half wave of a certain polarity is caused to be impressed, the result is essentially no more than merely forming high-frequency pulses of a certain polarity. Therefore, said method differs basically from the essence of the present invention.

In another spark discharge machining apparatus which has been proposed heretofore, pulses of a certain polarity are impressed across the electrode and work piece and, simultaneously, a high-frequency voltage is superimposed thereon. Analysis of the discharge current of this apparatus indicates that the imposed high-frequency current is modulated by the discharge current of the condenser, that is, by the pulses of a certain polarity, and a high-frequency current is continuously caused to flow between the electrode and work piece. Consequently, the high-frequency current flows not only during the time of short-circuiting, but also during the other normal period of time and contributes directly to the machining by spark discharging. On this point, also, the apparatus differs substantially from the essence of the present invention.

The unique features and advantages of this invention and the manner in which the foregoing objects may best be achieved will be more clearly understood by reference to the following detailed description of a few representative embodiments of the invention when taken in connection with the accompanying drawings.

FIGURE 6 is an electrical connection diagram of a further embodiment according to the invention, wherein a plurality of secondary, high-frequency discharge circuits, each having a slightly different resonance frequency, is provided.

FIGURE 7 is a graphical diagram for describing the secondary, follow-up discharge voltage of the apparatus shown in FIGURE 6.

FIGURE 8 is a graphical diagram showing the primary, main discharge and secondary, follow-up discharge voltage wave form of the apparatus of FIGURE 6.

FIGURE 9 is an electrical connection diagram showing another embodiment of the secondary, follow-up discharge circuit corresponding to that of FIGURE 6.

FIGURE 10 is an electrical connection diagram showing a still further embodiment of this invention, wherein a switching device for selectively connecting one of a plurality of secondary, follow-up discharge circuits of different time constants is provided.

Throughout the above illustrations, like reference numerals or symbols designate like or equivalent circuit elements.

Figure 1:
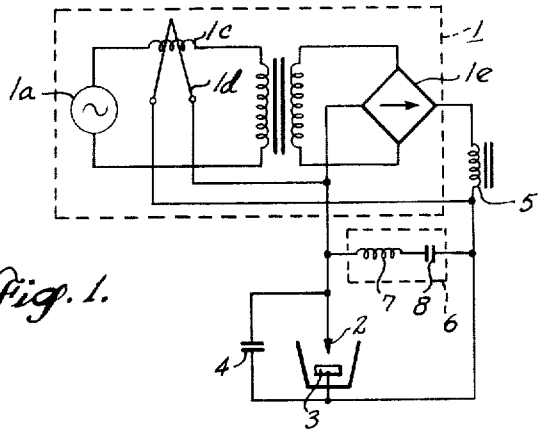
FIGURE 1 is an electrical connection diagram showing one embodiment of this invention, wherein a series resonant-type, secondary, follow-up discharge circuit is provided.

Referring to FIGURE 1, the machining electric power supply source 1 is used for impressing electric pulse voltage across the discharge gap between an electrode 2 and a work piece 3 which is used as another electrode. In the design of said power source 1 consideration has been given to the providing of control so that, at the time of short-circuiting of said gap, the output voltage of said power source will be lowered abruptly. A condenser 4 for producing electric pulses is charged by the output of said power source 1 through an inductor 5 acting as a filter. The power source 1 is composed of an alternating current source 1a, a transformer 1b, a saturable reactor 1c having a direct-current exciting coil 1d, and a rectifier device 1e, said exciting coil 1d being connected to the output side of said rectifier device. Accordingly, when the discharge gap between the electrode 2 and work piece 3 is short-circuited, the current of the exciting coil 1d is lowered abruptly, whereby the impedance of the reactor 1c becomes large and the output voltage of the power source 1 is lowered abruptly.

Figure 2:
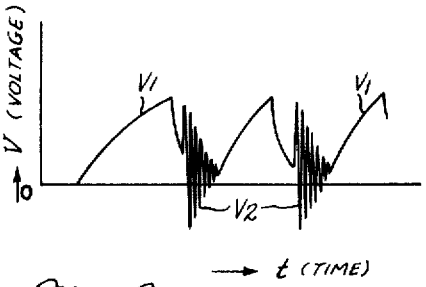
FIGURE 2 is a graphical diagram for describing the primary, main discharge, voltage wave form and the secondary, follow-up discharge voltage wave form occurring in an embodiment of the apparatus of the invention.

It is a unique feature of the present invention that a series resonant circuit 6 is connected across the electrode 2 and the work piece 3 and at the same time in parallel to a condenser 4 for producing pulses. Said series resonant circuit 6 is composed of an inductor 7 and a condenser 8. The capacity of the condenser 8 is indicated by experimental results to be suitable when it is of the order of one-tenth of the capacity of the condenser 4 for producing pulses. In normal operation it may be seen that condenser 4 may have a capacity varying from about 0.1 to 70 microfarads dependent upon the speed of erosion and finish desired, while condenser 8 would have a capacity varying from about 0.01 to 15 microfarads. When a short circuit occurs the charge held by condenser 4 becomes instantaneously 0; however, the charge held by a condenser 8 will flow into the short circuit creating heat to burn, hence eliminate the short circuit, at which instant discharges will recommence from the primary circuit. The wave forms, or wave profiles, of the primary, main discharge and secondary, follow-up discharge voltages at the time of discharge machining may be represented graphically as shown in FIGURE 2. As indicated in this diagram, the voltage of pulse $V_1$ produced from the condenser 4 achieves the metal machining due to spark discharging under a certain period of cycle. If, as a supposition, short-circuiting occurs in each cycle, the voltage of the secondary, follow-up discharge pulse $V_2$ will be generated as shown in FIGURE 2, and, only when the voltage of the pulse $V_1$ reaches a minimum value or a value in the vicinity thereof, the pulse $V_2$ appears suddenly.

Figure 3:
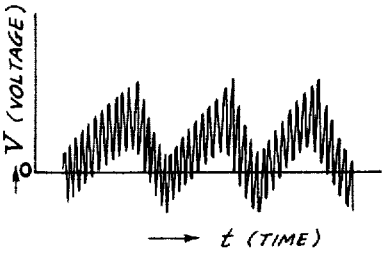
FIGURE 3 is a graphical diagram showing the discharge voltage wave form in the case of an apparatus proposed heretofore, wherein high-frequency waves are superimposed on pulses.

In the case of apparatus proposed heretofore wherein a high-frequency electric power source is connected in parallel with a condenser for producing pulses, the voltage wave forms differ from those of FIGURE 2 and are as shown in FIGURE 3. As is apparent from this diagram, the high-frequency electric voltage is constantly superimposed on the pulse voltage, and a constant, high-frequency energy is imparted continuously between the electrode and the work piece during the time of machining by spark discharging and also during the time of short-circuiting. Consequently, the spark discharging is constantly accompanied by the possibility of its conversion into an arc discharging.

In contrast, in the case of apparatus of the present invention, the high-frequency electric current due to the secondary, follow-up discharge is zero at the time of beginning of spark discharging and builds up from zero only after circuit closure due to short-circuiting, consequently, contributing in no way to the spark discharge machining. Accordingly, it is possible to prevent, completely, the conversion into an arc discharging.

Moreover, in the case of conventional, discharge machining apparatus, wide gap between the electrode and work piece are used out of fear of short-circuiting, even at the sacrifice of machining speed. In contrast, in the case of the apparatus of the present invention, since it is always possible to melt away the short-circuit points which create possibilities of short-circuiting, it is possible to place the electrode and the work piece as closely as possible to each other, and it is possible to multiply the machining speed and, at the same time, to improve the degree of smoothness of the machined surface.

Figure 4:
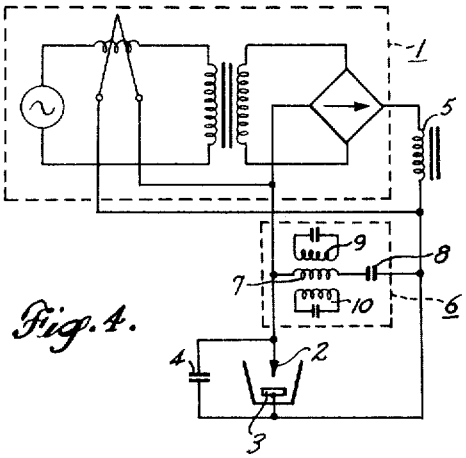
FIGURE 4 is an electrical connection diagram of another embodiment of the secondary, high-frequency discharge circuit according to the invention.
Figure 5:
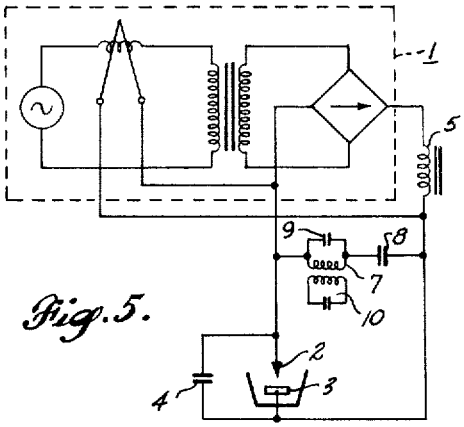
FIGURE 5 is an electrical connection diagram of a modification of the circuit shown in FIGURE 4.

The secondary, follow-up discharge circuit need not be limited to a series resonant circuit; it is possible to use a C-type resonant circuit. The use of said C-type resonant circuit is illustrated in FIGURES 4 and 5, wherein parallel resonant circuits 9 and 10 are connected to an inductor 7 of a series resonant circuit.

Moreover, the secondary, follow-up discharge need not always be a high-frequency electric current. As long as the short circuit points are melted away by the joule heat, the use of pulses with narrow widths may also be recommended. However, it is not the best practice to supply this pulse from another electric power source because, although it is possible to provide, especially an electric power source which will pass a pulse for secondary, follow-up discharge for every interval of the pulse for the main discharge, this will not only complicate the apparatus needlessly, but also create problems in cost. Furthermore, the providing of a separate electric power source for selectively producing pulses only at the time of short-circuiting is beyond consideration.

In view of the above points, the present invention further proposes an electric power source for discharge machining provided with a plurality of high-frequency resonant circuits, each with a slightly different resonant frequency. One embodiment thereof is illustrated in FIGURE 6, wherein the secondary, follow-up discharge circuit 6 comprises a series resonant circuit composed of a reactor 7' and a condenser 8', a series resonant circuit composed of a reactor 7 and a condenser 8, and a series resonant circuit composed of a reactor 7'' and a condenser 8'', said resonant circuits being connected in parallel, and having resonance frequencies differing slightly from one another. The wave forms of the high-frequency discharge currents due to these circuits at the time of short-circuiting are as shown in FIGURE 7, and the envelope curve of said forms is a damped oscillation of a rectangular wave with positive and negative polarity. If the apparatus is designed so that the damping is effected abruptly and the following pulse for spark discharge machining is impressed to the machine points at the time when the said envolpe curve converts to the negative side, the machining electric voltage will be approximately as shown in FIGURE 8. Thus, it is possible to produce pulses selectively at the time of short-circuiting with the use of an extremely simple circuit, and moreover, it is possible to make said pulses have greater energy than that of any other wave form, that is, to make pulses of rectangular wave form.

Furthermore, the composing of the secondary, follow-up discharge circuit with the use of a plurality of resonant circuits has the following advantages. Even if the capacity of the condenser 8 is increased in an effort to obtain a high energy from a single, high-frequency discharge circuit as shown in FIGURE 1, the discharge current cannot be increased in proportion to the capacity, and in general, a linear relation does not exist between said discharge current and capacity. Therefore, if the capacity of the condenser 8 is divided, and distributed among the parallel circuits 7–8, 7′–8′, . . . 7″–8″ as shown in FIGURE 6, the discharge current will increase approximately linearly in accordance with the number of parallel circuits, and results which could never be expected from a single, high-frequency discharge circuit will be obtainable.

For this follow-up discharge circuit the same effect can be obtained, of course, by connecting in parallel a plurality of parallel resonant circuits 7′,8′, 7″,8″, . . . 7‴, 8‴ as shown in FIGURE 9, in which condensers 13, 13′ and 13″ are provided for suppressing direct current.

It has been determined from experimental results that if the above-mentioned secondary, follow-up discharge energy instead of being supplied uniformly in an indiscriminate manner to any work to be machined is varied according to the kind of metal of the work, good results will be obtainable. More specifically, even if the short-circuit points are to be melted away there are many metals requiring a great variety of form of follow-up discharge such as depending on the kind of metal, those for which good results can be obtained by suitable retarding the instant of beginning of discharging of the secondary, follow-up discharge current; those requiring a considerably long period of current flow, or those for which good results are obtained by advancing, as much as possible, the instant of beginning of discharging and, at the same time, holding the current flow period to a short time. For example, in the case wherein the work to be machined is copper, good results are obtained by causing the secondary, follow-up discharge to take place after the elapse of a short time subsequent to the discharge of the pulse for spark discharge machining; or, in the case of extremely hard metals, it is preferable that the secondary, follow-up discharge take place immediately after the completion of the spark discharge.

In view of the above-described points, the present invention provides a power-supply apparatus for discharge machining which is further so composed as to enable the selection of the secondary, follow-up discharge circuit of the optimum time constant, in each case for the metal material of the work piece and the electrode.

Referring to FIGURE 10, the secondary, follow-up discharge circuit 6 is composed of high-frequency, resonant circuits 6′, 6″ and 6‴, each having a different time constant. One end of each of these circuits is connected to the electrode 2, and the other end thereof is connected to switch taps 11′, 11″ and 11‴. The said switch taps are provided with a changeover switch 12, which enables adjustment, at will, in accordance with the kind of metal used. Thus, each circuit is selectively connected to the condenser 8′, 8″ or 8‴ for producing pulses, and the aforesaid object is achieved.

It is evident that, instead of the use of the above-described switching mechanism, the use of variable inductors or variable condensers in the high-frequency, resonant circuits would enable the accomplishment of the same object.

Since it is obvious that many changes and modifications can be made in the above-described details without departing from the nature and spirit of the invention, it is to be understood that the invention is not to be limited to the details described herein and to the embodiments illustrated in the accompanying drawings except as set forth in the appended claims.

I claim as my invention:

[1. Electric discharge machining apparatus comprising, in combination with a machining electrode and base means adapted to present a metal workpiece in electric spark discharge relationship to said electrode separated therefrom by a spbark gap, a voltage source including a storage capacitance connected between said electrode and workpiece and means to charge said capacitance to predetermined machining voltage through an impedance, thereby to create intermittent primary spark discharge impulses between the electrode and workpiece, the transient voltage across said gap dropping by a substantially greater amount when a short circuit develops across said gap during a discharge impulse than during other, normal discharge impulses, and separate circuit means also connected across said gap and selectively responsive to said greater voltage drop to apply secondary spark discharge voltage impulses across the electrode and workpiece substantially only in response to such greater voltage drops, thereby to clear the short-circuit condition by the added discharge energy of said secondary impulses without adding such energy to normal discharge impulses.]

[2. The apparatus defined in claim 1, wherein the separate circuit means comprises a resonant circuit having a natural frequency which is at least several times the primary impulse basic frequency.]

[3. The apparatus defined in claim 1, wherein the separate circuit means comprises a plurality of separate resonant circuits having respectively different resonance frequencies each of which is at least several times the primary impulse basic frequency, and switch means operable selectively to connect said resonant circuits individually across said electrode and workpiece.]

[4. The apparatus defined in claim 1, wherein the impedance is variable and the power source includes means responsive to variations in spark gap voltage to increase the value of said impedance in response to the decreased spark gap voltage during a short circuit across the gap.]

[5. The apparatus defined in claim 4, wherein the separate circuit means comprises L-C resonant circuit means having a natural frequency substantially higher than the primary spark discharge frequency.]

[6. An electric power supply apparatus for electric discharge machining of a workpiece by a machining electrode, said apparatus comprising a storage condenser connected across the electrode and workpiece, means to charge the storage condenser recurringly to a discharge voltage producing periodic primary spark discharge impulses between the electrode and workpiece, said latter means including an alternating current source, a rectifier energized by said source and having an output connected to the storage condenser, and a normally saturated saturable reactor interposed between the source and rectifier and having a control winding connected to be energized by said rectifier output, the voltage drop across the workpiece and electrode during a primary discharge impulse becoming abnormally great during a short-circuit condition therebetween, and a relatively high-frequency resonant circuit also connected across said electrode and workpiece and operable selectively in response to said abnormally great voltage drops to generate secondary follow-up discharges therebetween for clearing such short-circuit condition.]

[7. An electric power supply apparatus for electric discharge machining of a workpiece by a machining electrode, said apparatus comprising a storage condenser connected across the electrode and workpiece, means to charge the storage condenser recurringly to a discharge voltage producing periodic primary spark discharge impulses between the electrode and workpiece, said latter means including an alternating current source, a rectifier energized by said source and having an output connected to the storage condenser, and a normally saturated saturable reactor interposed between the source and rectifier and having a control winding connected to be energized by said rectifier output, and means to clear a short-circuit condition between the electrode and workpiece, comprising a plurality of relatively high-frequency resonant circuits of slightly different natural frequencies, respectively, also connected in parallel across said electrode and workpiece and operable in response to the electrical transient which develops during a short-circuit therebetween to generate secondary follow-up discharges therebetween in response to such primary discharges.]

[8. Electric spark discharge machining apparatus comprising, in combination with an electrode and workpiece separated by a discharge gap, means connected across the electrode and workpiece to induce recurrent primary spark discharge impulses through said gap each attended normally by predetermined gap voltage transients, and separate circuit means connected across the electrode and workpiece normally unresponsive to said gap voltage transients, said separate circuit means being selectively responsive to abnormal voltage transients attending short circuiting of the gap during a primary impulse, and being operable thereby to induce secondary discharges through said gap to clear the short-circuit condition.]

[9. The combination defined in claim 8, wherein the separate circuit means comprises at least one resonant circuit having a time constant which is a small fraction of the duration of the primary discharges.]

[10. In electric spark discharge machining by producing a succession of primary spark discharge impulses across a spark gap between an electrode and workpiece, the method of controlling machining voltage across the spark gap comprising the steps of recurringly increasing the machining voltage to a value which recurringly initiates a primary spark discharge across the gap succeeded immediately by a normal drop of gap voltage to a value normally sufficient to terminate the spark discharge, and impressing a secondary, oscillatory discharge voltage across the gap selectively in response to an abnormally abrupt reduction of gap voltage inherently occurring under short circuiting of the gap which prevents termination of an individual primary discharge, whereby said secondary discharge voltage adds energy to the discharge sufficient to clear the short circuit.]

*11. The process of electrical discharge machining of a conductive workpiece across a dielectric filled gap by an electrode tool comprising the steps of passing a series of machining pulses of relatively low frequency and long duration across the gap, impressing a series of relatively high frequency, short duration pulses of successively diminishing amplitude across the gap prior to the normal completion of each machining pulse and terminating said higher frequency pulses prior to the initiation of the next following machining pulse, the time duration of each short duration pulses being a small fraction of that of said machining pulses.*

*12. The process of electrical discharge machining of a conductive workpiece across a dielectric filled gap by an electrode tool comprising the steps of passing a series of machining pulses of relatively low frequency and long duration across the gap, impressing a series of short duration, damped, oscillatory pulses of successively diminishing amplitude across the gap at a frequency at least several times the frequency of said machining pulses prior to the normal completion of each machining pulse and terminating said oscillatory pulses prior to the initiation of the next following machining pulse, the time duration of each short duration pulse being a small fraction of that of said machining pulses.*

*13. The process of electrical discharge machining of conductive workpiece across a dielectric filled gap by an electrode tool comprising the steps of passing a series of machining pulses of relatively low frequency and long duration across the gap, impressing across the gap at the time of sharp drop in voltage across the gap and prior to normal completion of each machining pulse a series of short duration, damped, oscillatory pulses of higher frequency than said machining pulses, and terminating said oscillatory pulses prior to initiation of the next following machining pulse, the time duration of each short duration pulse being a small fraction of that of said machining pulses.*

*14. The process of electrical discharge machining of a conductive workpiece across a dielectric filled gap by an electrode tool comprising the steps of passing a series of machining pulses of relatively low frequency and long duration across the gap, and impressing simultaneously across the gap a plurality of oscillatory voltage waveforms of slightly varying frequencies, all in excess of the machining pulse frequency to provide a composite, damped, oscillatory waveform between successive machining pulses said composite waveform superimposed upon the latter portion of each preceding machining pulse.*

*15. The process of electrical discharge machining of a conductive workpiece across a dielectric filled gap by an electrode tool comprising the steps of passing a series of machining pulses of relatively low frequency and long duration across the gap and modulating each of said machining pulses with a series of superimposed, high energy, shorter duration, higher frequency pulses for a time period preceding its normal completion and falling within one half cycle of its frequency of repetition, the time duration of each shorter duration pulse being a small fraction of that of said machining pulses.*

*16. The process of electrical discharging machining of a conductive workpiece by an electrode tool across a dielectric coolant filled gap comprising the steps of passing a series of machining pulses of relatively low frequency and long duration across the gap, and impressing simultaneously across the gap a plurality of oscillatory voltage waveforms of slightly differing frequencies, all in excess of the machining pulse frequency, to provide a composite, damped, oscillatory waveform of positive and negative polarity between successive machining pulses, said composite waveform superimposed upon the latter portion of each preceding machining pulse.*

*17. The process of electrical discharge machining of a conductive workpiece by an electrode tool across a dielectric coolant filled gap comprising the steps of passing a series of machining pulses of relatively low frequency and long duration across the gap, and impressing simultaneously across the gap a plurality of oscillatory voltage waveforms of slightly differing frequencies, all in excess of the machining pulse frequency, to provide a composite, damped oscillatory waveform between successive machining pulses, said composite waveform spaced by a short time period from each preceding machining pulse.*

*18. The process of electrical discharge machining of a conductive workpiece by an electrode tool across a dielectric coolant filled gap comprising the steps of passing a seies of machining pulses of relatively low frequency and long duration across the gap, and impressing simultaneously across the gap a plurality of oscillatory voltage waveforms of slightly differing frequencies, all in excess of the machining pulse frequency, to provide a composite, damped, oscillatory waveform between successive machining pulses, said composite waveform immediately following the preceding machining pulse.*

*19. The process of electrical discharge machining of a conductive workpiece by an electrode tool across a dielectric filled gap comprising the steps of charging a gap capacitor to a voltage sufficient to initiate a gap breakdown pulse and, subsequent to gap breakdown, impressing simultaneously across the gap a plurality of oscillatory voltage waveforms of relatively high, slightly differing frequencies, to provide a composite, damped, oscillatory waveform across the gap.*

*20. The process of electrical discharge machining of a conductive workpiece by an electrode tool across a dielectric filled gap comprising the steps of charging a gap capacitor to a voltage sufficient to initiate a gap breakdown pulse and, subsequent to gap breakdown, impressing simultaneously across the gap a plurality of oscillatory voltage waveforms of relatively high, slightly differing frequencies, to provide a composite, damped, oscillatory waveform across the gap, said composite waveform spaced by a short time period from said gap breakdown pulse.*

*21. The process of electrical discharge machining of a conductive workpiece by an electrode tool across a dielectric filled gap comprising the steps of charging a gap capacitor to a voltage sufficient to initiate a gap breakdown pulse and, subsequent to gap breakdown, impressing simultaneously across the gap a plurality of oscillatory voltage waveforms of relatively high, slightly differing frequencies, to provide a composite, damped, oscillatory waveform across the gap, said composite waveform immediately following said gap breakdown pulse.*

*22. The process of electrical discharge machining of a conductive workpiece by an electrode tool across a dielectric coolant filled gap comprising the steps of periodically initiating gap breakdown and, subsequent to each gap breakdown, passing across the gap a series of oscillatory pulses of relatively high frequency and of successively diminishing amplitude, said series including at least two slightly differing frequency components.*

References Cited by the Examiner

The following references, cited by the Examiner, are of record in the patented file of this patent or the original patent.

UNITED STATES PATENTS

| | | | |
|---|---|---|---|
| 2,880,374 | 3/1959 | Mulder | 315—205 |
| 2,895,080 | 7/1959 | Branker | 315—205 |
| 2,951,969 | 9/1960 | Matulaitis et al. | 219—69 X |
| 3,089,059 | 5/1963 | Porterfield et al. | 219—69 X |

RICHARD M. WOOD, *Primary Examiner.*

RALPH G. NILSON, *Examiner.*

L. D. BULLION, R. F. STAUBLY, *Assistant Examiners*